(12) United States Patent
Branyon, III et al.

(10) Patent No.: US 10,124,449 B2
(45) Date of Patent: Nov. 13, 2018

(54) TEMPORARY FASTENER FOR SIMULTANEOUS WORKPIECE AND DRILL JIG CLAMPING

(71) Applicant: The Boeing Company, Chicago, IL (US)

(72) Inventors: Charlie E. Branyon, III, Summerville, SC (US); Nicholas Wayne Fudela, Mt. Pleasant, SC (US)

(73) Assignee: The Boeing Company, Chicago, IL (US)

( * ) Notice: Subject to any disclaimer, the term of this patent is extended or adjusted under 35 U.S.C. 154(b) by 515 days.

(21) Appl. No.: 14/737,769

(22) Filed: Jun. 12, 2015

(65) Prior Publication Data

US 2016/0363146 A1    Dec. 15, 2016

(51) Int. Cl.
| | | |
|---|---|---|
| *F16B 5/02* | (2006.01) | |
| *F16B 13/06* | (2006.01) | |
| *B23P 11/00* | (2006.01) | |
| *F16B 19/10* | (2006.01) | |

(52) U.S. Cl.
CPC ............ *B23P 11/00* (2013.01); *F16B 19/109* (2013.01); *B23P 2700/01* (2013.01)

(58) Field of Classification Search
CPC ...... B23P 11/00; B23P 2700/01; F16B 19/109
See application file for complete search history.

(56) References Cited

U.S. PATENT DOCUMENTS 6,755,407 B1 *  6/2004  Olson .................... B23Q 9/02
                                                269/48.1

OTHER PUBLICATIONS

"All Products," Centrix, LLC, copyright 2015, 3 pages, accessed Jun. 9, 2015. http://centrix-llc.com/products#overlay-context=products%3Fpage%3D1.

* cited by examiner

*Primary Examiner* — John C Hong
(74) *Attorney, Agent, or Firm* — Yee & Associates, P.C.

(57) ABSTRACT

A method and temporary fastener for substantially simultaneously clamping a drill jig and a plurality of layers. The temporary fastener may comprise a first system and a second system. The first system may be configured to secure the temporary fastener to a drill jig. The second system may be configured to secure the temporary fastener to a plurality of layers of material beneath the drill jig.

21 Claims, 16 Drawing Sheets

TEMPORARY FASTENER FOR SIMULTANEOUS WORKPIECE AND DRILL JIG CLAMPING

BACKGROUND INFORMATION

1. Field

The present disclosure relates generally to temporary fasteners and, in particular, to temporary fasteners for drilling. More particularly, the present disclosure relates to a method and apparatus for simultaneously clamping a plurality of layers together and clamping a drill jig to the plurality of layers.

2. Background

In a manufacturing environment, it may be desirable to temporarily secure a tool, such as a drill jig, to a workpiece while a drilling operation or other desirable operation is performed. Further, when the workpiece includes a plurality of layers, it may be desirable to secure the plurality of layers to each other during the operation. Conventional temporary fasteners may only perform one of these clamping operations. A conventional temporary fastener may only clamp the tool to the workpiece or clamp the plurality of layers to each other.

Conventional temporary fasteners may extend past a drill jig while clamping the drill jig to the workpiece. The conventional temporary fastener extending past the drill jig may interfere with locating a drill in a desirable location relative to the workpiece.

Further, it may be desirable to increase the number of clamping locations between the tool and the workpiece after the drilling operation is performed. It may also be desirable to increase the number of clamping locations between the plurality of layers after the drilling operation is performed. Inserting temporary fasteners may take more time than desirable.

Therefore, it would be desirable to have a method and apparatus that take into account at least some of the issues discussed above, as well as other possible issues. For example, it may be desirable to decrease the amount of time to insert temporary fasteners. Further, it may be desirable to increase the number of clamping locations for at least one of clamping between the plurality of layers or clamping between a tool and a workpiece.

SUMMARY

In an illustrative embodiment, a temporary fastener may be provided. The temporary fastener may comprise a first system and a second system. The first system may be configured to secure the temporary fastener to a drill jig. The second system may be configured to secure the temporary fastener to a plurality of layers of material beneath the drill jig.

In another illustrative embodiment, a method may be provided. A temporary fastener may be inserted into a hole of a drill jig. The temporary fastener may be secured to the drill jig using a first system of the temporary fastener. The temporary fastener may be secured to a plurality of layers of material beneath the drill jig using a second system of the temporary fastener.

In yet another illustrative embodiment, a temporary fastener may be provided. The temporary fastener may comprise a first system and a second system. The first system may secure the temporary fastener to a drill jig. The first system may comprise an expandable housing and a first rotatable member. The second system may secure the temporary fastener to a plurality of layers of material beneath the drill jig. The second system may comprise an expandable shaft and a second rotatable member rotatably connected to the expandable shaft by the threads.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
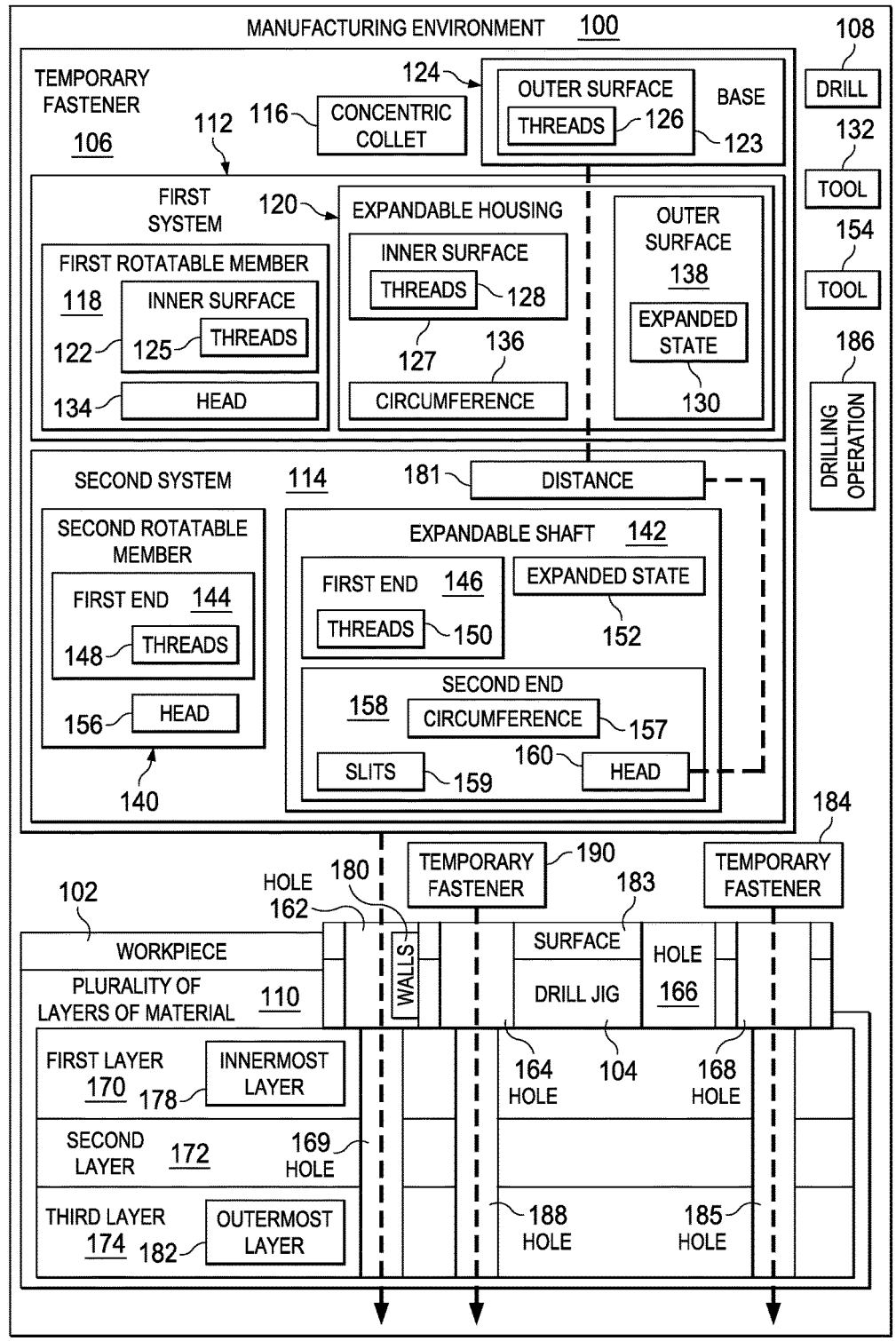
FIG. 1 is an illustration of a block diagram of a manufacturing environment in accordance with an illustrative embodiment.

Turning now to FIG. 1, an illustration of a block diagram of a manufacturing environment is depicted in accordance with an illustrative embodiment. In this illustrative example, manufacturing environment 100 in FIG. 1 is depicted in block form to illustrate different components for one or more illustrative embodiments. Manufacturing environment 100 may include workpiece 102, drill jig 104, temporary fastener 106, and drill 108. Temporary fastener 106 may be positioned to clamp drill jig 104 to workpiece 102. Further, temporary fastener 106 may be positioned to clamp plurality of layers of material 110 of workpiece 102 to each other. Temporary fastener 106 may substantially simultaneously clamp drill jig 104 and plurality of layers of material 110.

Temporary fastener 106 may have first system 112 and second system 114. First system 112 and second system 114 may be concentric. As a result, temporary fastener 106 may be described as concentric collet 116. First system 112 may be configured to secure temporary fastener 106 to drill jig 104. Second system 114 may be configured to secure temporary fastener 106 to plurality of layers of material 110 beneath drill jig 104.

First system 112 may include first rotatable member 118 and expandable housing 120. First rotatable member 118 and expandable housing 120 may be concentric.

First rotatable member 118 may have inner surface 122 that interacts with outer surface 123 of base 124. In some illustrative examples, inner surface 122 may have threads 125 that interact with threads 126 of outer surface 123. As threads 125 of inner surface 122 interact with threads 126 of outer surface 123, first rotatable member 118 may move downward into expandable housing 120.

In some illustrative examples, inner surface 127 of expandable housing 120 may have threads 128. Threads 126 of base 124 may interact with threads 128 of expandable housing 120. As threads 125 of inner surface 122 interact with threads 126 of outer surface 123, first rotatable member 118 may put expandable housing 120 into expanded state 130.

In some illustrative examples, tool 132 may interact with head 134 of first rotatable member 118 to rotate first rotatable member 118 relative to expandable housing 120. As first rotatable member 118 rotates relative to expandable housing 120, first rotatable member 118 may move into or out of expandable housing 120. By moving into or out of expandable housing 120, first rotatable member 118 may change circumference 136 of outer surface 138 of expandable housing 120.

Second system 114 of temporary fastener 106 may include second rotatable member 140 and expandable shaft 142. Second rotatable member 140 may be concentric with expandable shaft 142. First end 144 of second rotatable member 140 may interact with first end 146 of expandable shaft 142. In some illustrative examples, second rotatable member 140 may have threads 148. In these illustrative examples, threads 148 of second rotatable member 140 may interact with threads 150 of expandable shaft 142.

As threads 148 of second rotatable member 140 interact with threads 150 of expandable shaft 142, second rotatable member 140 may put expandable shaft 142 into expanded state 152. In some illustrative examples, tool 154 may interact with head 156 of second rotatable member 140 to rotate second rotatable member 140 relative to expandable shaft 142. As second rotatable member 140 rotates relative to expandable shaft 142, second rotatable member 140 may move into or out of expandable shaft 142. By moving into or out of expandable shaft 142, second rotatable member 140 may change circumference 157 of second end 158 of expandable shaft 142. Second end 158 may have slits 159 to facilitate changing circumference 157. In some illustrative examples, second end 158 may also be called head 160.

Drill jig 104 may have hole 162, hole 164, hole 166, and hole 168. Temporary fastener 106 may be inserted into hole 162 to secure drill jig 104 to workpiece 102. When temporary fastener 106 is inserted into hole 162, expandable shaft 142 may extend through hole 169. Hole 169 may extend through plurality of layers of material 110 including first layer 170, second layer 172, and third layer 174. When temporary fastener 106 is inserted into hole 162, base 124 of temporary fastener 106 may contact first layer 170. In some illustrative examples, first layer 170 may also be referred to as innermost layer 178.

After inserting temporary fastener 106 into hole 162, first rotatable member 118 may be rotated relative to expandable housing 120 to place expandable housing 120 into expanded state 130. In expanded state 130, expandable housing 120 may contact walls 180 of hole 162. In expanded state 130, expandable housing 120 may retain temporary fastener 106 in hole 162. When expandable housing 120 is in expanded state 130, distance 181 of head 160 from base 124 may be increased.

After placing expandable housing 120 in expanded state 130, second rotatable member 140 may be rotated relative to expandable shaft 142. By rotating second rotatable member 140 relative to expandable shaft 142, distance 181 of head 160 from base 124 may be decreased.

Rotating second rotatable member 140 relative to expandable shaft 142 may place expandable shaft 142 in expanded state 152. In expanded state 152, head 160 of expandable shaft 142 may contact outermost layer 182.

In this illustrative example, outermost layer 182 may be third layer 174. In expanded state 152, circumference 157 of expandable shaft 142 may not fit through hole 169.

In expanded state 152, plurality of layers of material 110 may be clamped between head 160 of expandable shaft 142 and base 124 of temporary fastener 106. When plurality of layers of material 110 are clamped between head 160 of expandable shaft 142 and base 124 of temporary fastener 106, plurality of layers of material 110 may be clamped to each other. When plurality of layers of material 110 are clamped between head 160 of expandable shaft 142 and base 124 of temporary fastener 106, drill jig 104 is clamped to workpiece 102.

Expandable housing 120 applies pressure to hole 162 of drill jig 104 when temporary fastener 106 is secured to drill jig 104. Expandable shaft 142 extends through and contacts plurality of layers of material 110 when temporary fastener 106 is secured to plurality of layers of material 110.

When temporary fastener 106 is installed in hole 162, clamping drill jig 104, and workpiece 102, temporary fastener 106 may not extend past surface 183 of drill jig 104. In some illustrative examples, when temporary fastener 106 is clamped to drill jig 104 and workpiece 102, temporary fastener 106 may be substantially flush with surface 183 of drill jig 104. For example, when temporary fastener 106 is clamped to drill jig 104 and workpiece 102, first rotatable member 118 may be substantially flush with surface 183 of drill jig 104.

In some illustrative examples, when temporary fastener 106 is clamped to drill jig 104 and workpiece 102, temporary fastener 106 may be recessed from surface 183 of drill jig 104. For example, when temporary fastener 106 is clamped to drill jig 104 and workpiece 102, first rotatable member 118 may be recessed from surface 183 of drill jig 104.

In some illustrative examples, temporary fastener 184 may also clamp plurality of layers of material 110 together and clamp drill jig 104 to workpiece 102. Temporary fastener 184 may have substantially the same design as temporary fastener 106. Temporary fastener 184 may be inserted into hole 168 and clamp plurality of layers of material 110 using hole 185. In some illustrative examples, at least two temporary fasteners, such as temporary fastener 106 and temporary fastener 184, may be used to clamp workpiece 102 and drill jig 104 prior to performing drilling operation 186 on workpiece 102.

After clamping workpiece 102 and plurality of layers of material 110, drill 108 may perform drilling operation 186 on workpiece 102. For example, drill 108 may drill hole 188 through plurality of layers of material 110.

In some illustrative examples, after drilling hole 188 through plurality of layers of material 110, temporary fastener 190 may be inserted into hole 164. Temporary fastener 190 may have substantially the same design as temporary fastener 106.

The illustration of manufacturing environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, more than two temporary fasteners may clamp plurality of layers of material 110 and drill jig 104 prior to performing drilling operation 186. As another example, plurality of layers of material 110 may include greater than three layers. In this example, third layer 174 may not be outermost layer 182. In another example, plurality of layers of material 110 may include fewer than three layers. In this example, plurality of layers of material 110 may not include third layer 174.

Figure 2:
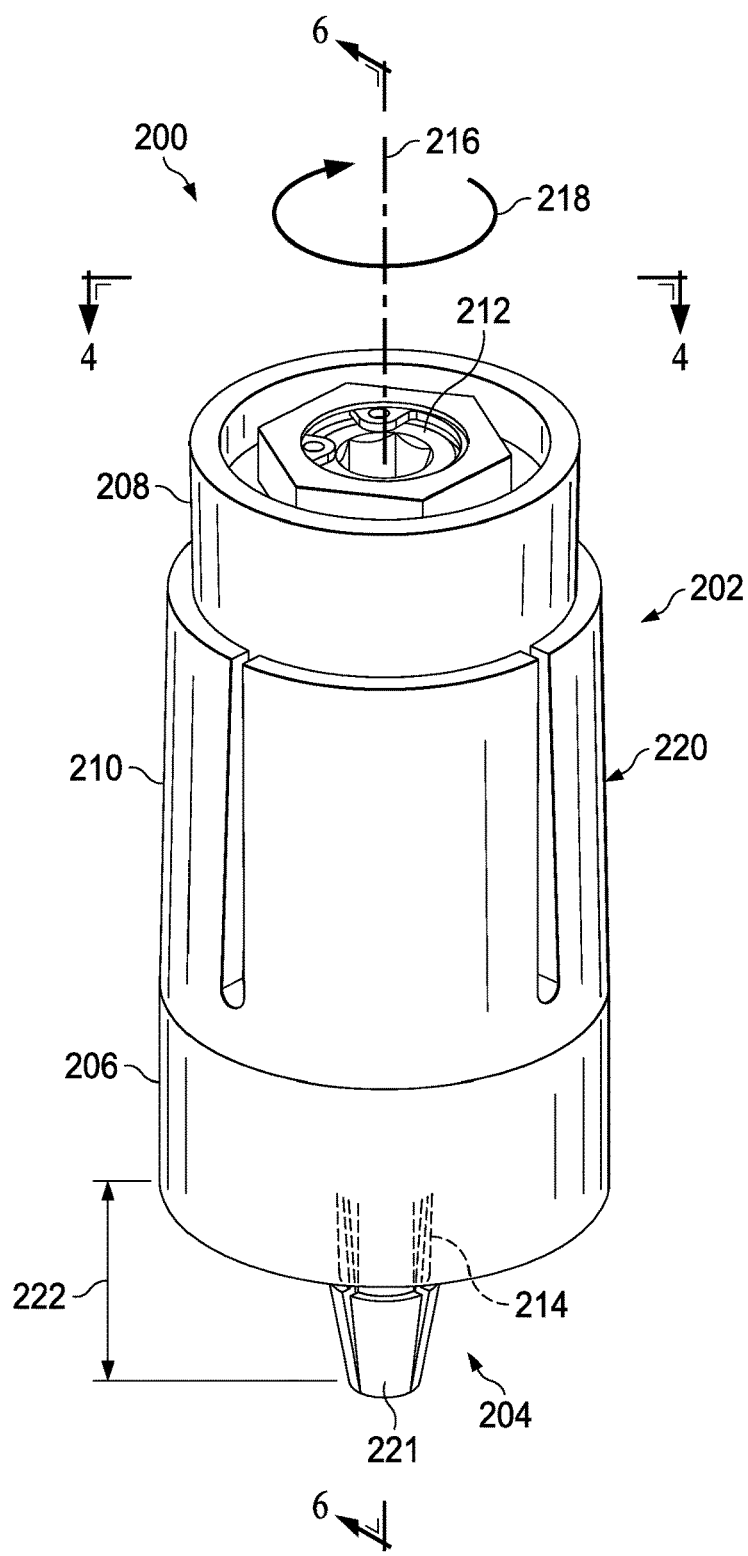
FIG. 2 is an illustration of a top isometric view of a temporary fastener in accordance with an illustrative embodiment.

Turning now to FIG. 2, an illustration of a top isometric view of a temporary fastener is depicted in accordance with an illustrative embodiment. Temporary fastener 200 may be a physical implementation of temporary fastener 106 of FIG. 1.

Temporary fastener 200 may include first system 202, second system 204, and base 206. First system 202 may include first rotatable member 208 and expandable housing 210. Second system 204 may include second rotatable member 212 and expandable shaft 214. As depicted, second rotatable member 212 is concentric with first rotatable member 208. Both second rotatable member 212 and first rotatable member 208 may rotate about axis 216. When first rotatable member 208 rotates in direction 218, circumference 220 of expandable housing 210 may increase. As depicted, head 221 of expandable shaft 214 may be distance 222 from base 206.

Figure 3:
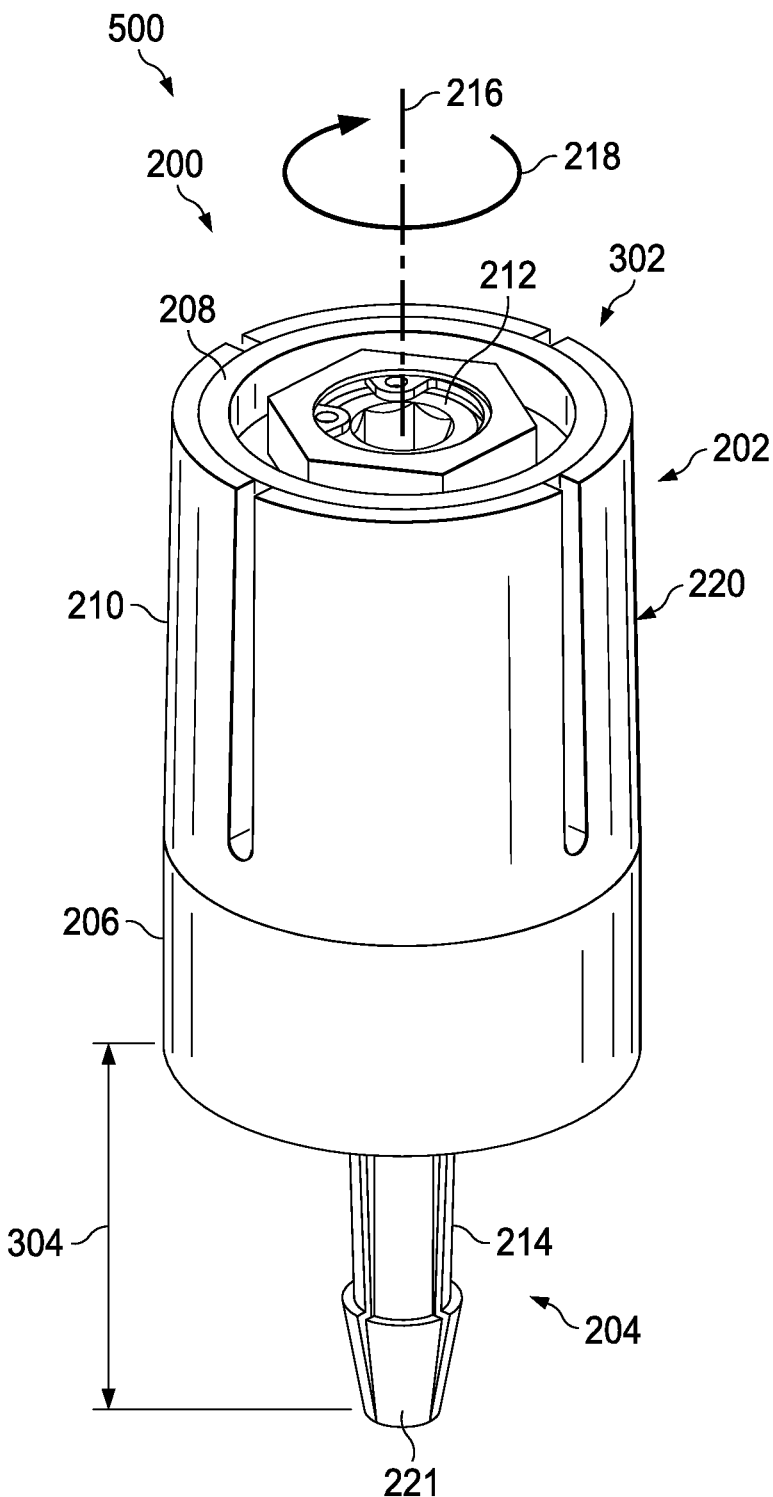
FIG. 3 is an illustration of a top isometric view of a temporary fastener in accordance with an illustrative embodiment.

Turning now to FIG. 3, an illustration of a top isometric view of a temporary fastener is depicted in accordance with an illustrative embodiment. View 300 may be a view of temporary fastener 200 when expandable housing 210 is in expanded position 302. Distance 304 of head 221 of expandable shaft 214 from base 206 may be greater than distance 222 of FIG. 2. Second rotatable member 212 may be rotated in direction 218 to decrease distance 304 and expand expandable shaft 214.

Figure 4:
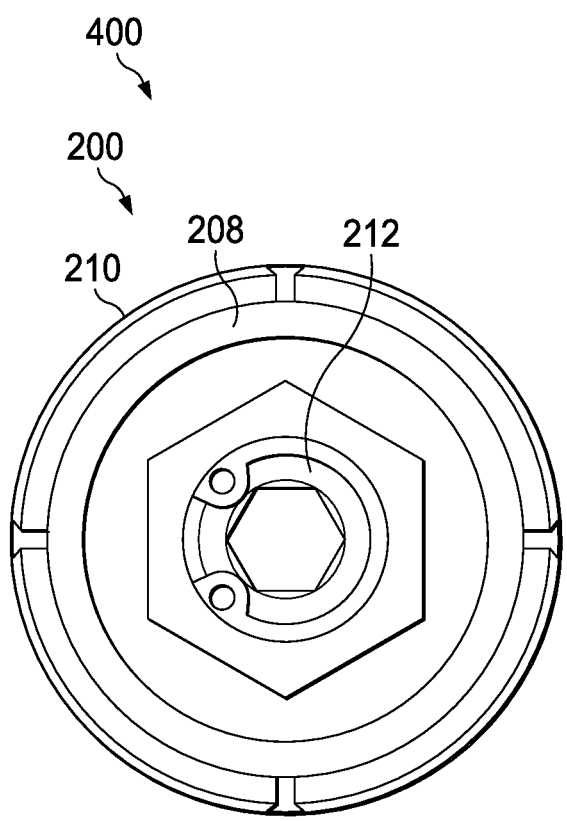
FIG. 4 is an illustration of a top view of a temporary fastener in accordance with an illustrative embodiment.

Turning now to FIG. 4, an illustration of a top view of a temporary fastener is depicted in accordance with an illustrative embodiment. View 400 may be a top view of temporary fastener 200 from direction 4 of FIG. 2. As depicted, second rotatable member 212 extends through first rotatable member 208. Each of second rotatable member 212, first rotatable member 208, and expandable housing 210 are concentric.

Figure 5:
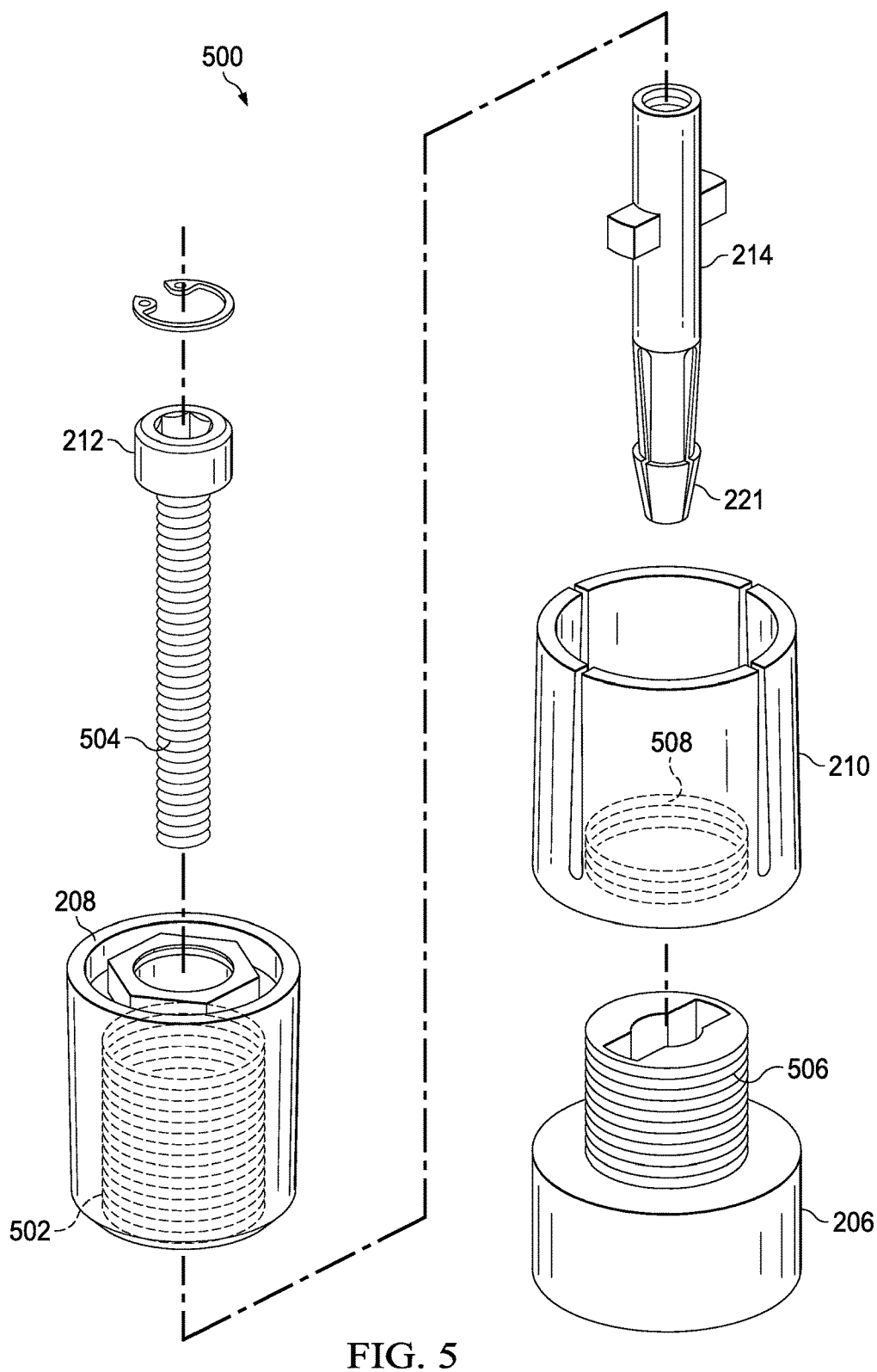
FIG. 5 is an illustration of an exploded isometric view of a temporary fastener in accordance with an illustrative embodiment.

Turning now to FIG. 5, an illustration of an exploded isometric view of a temporary fastener is depicted in accordance with an illustrative embodiment. View 500 may be an exploded view of temporary fastener 200 shown in FIG. 2. As depicted, first rotatable member 208 may have threads 502. Second rotatable member 212 may have threads 504. Base 206 may have threads 506. Expandable housing 210 may have threads 508.

Figure 6:
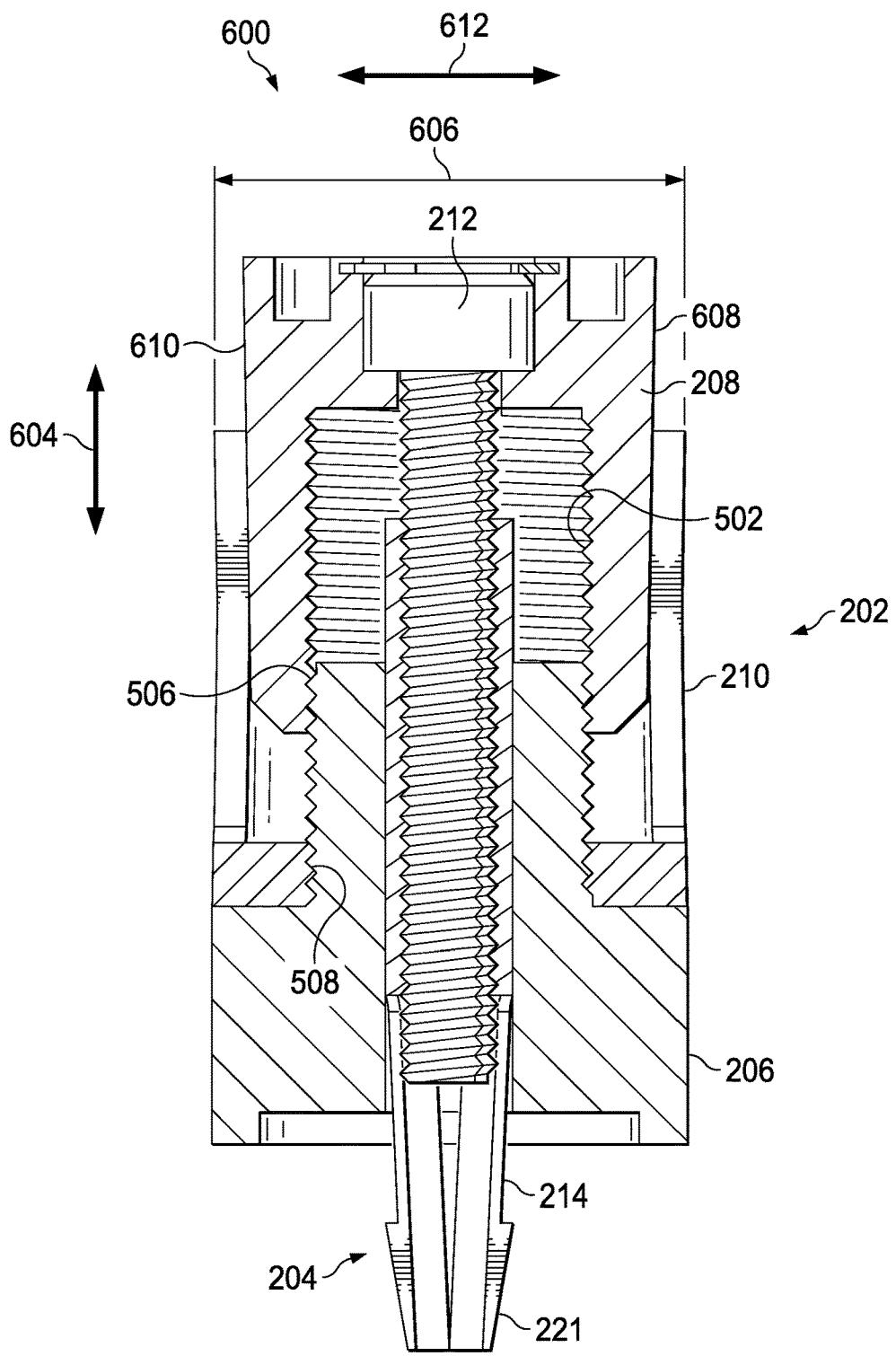
FIG. 6 is an illustration of a cross-sectional view of a temporary fastener in accordance with an illustrative embodiment.

Turning now to FIG. 6, an illustration of a cross-sectional view of a temporary fastener is depicted in accordance with an illustrative embodiment. View 600 may be a view from direction 6-6 of FIG. 2. As depicted, threads 502 of first rotatable member 208 may interact with threads 506 of base 206. As threads 502 of first rotatable member 208 interact with threads 506 of base 206, first rotatable member 208 may move in direction 604 into or out of expandable housing 210. As first rotatable member 208 moves into expandable housing 210, circumference 606 of expandable housing 210 may increase. Surface 608 of first rotatable member 208 may be angled 610. When surface 608 is angled 610, surface 608 may be slightly conical. Angled 610 surface 608 may cause circumference 606 of expandable housing 210 to change as first rotatable member 208 moves into or out of expandable housing 210. For example, as first rotatable member 208 moves in direction 604 into expandable housing 210, expandable housing 210 may expand in direction 612. Further, as first rotatable member 208 moves in direction 604 out of expandable housing 210, expandable housing 210 may contract in direction 614.

Figure 7:
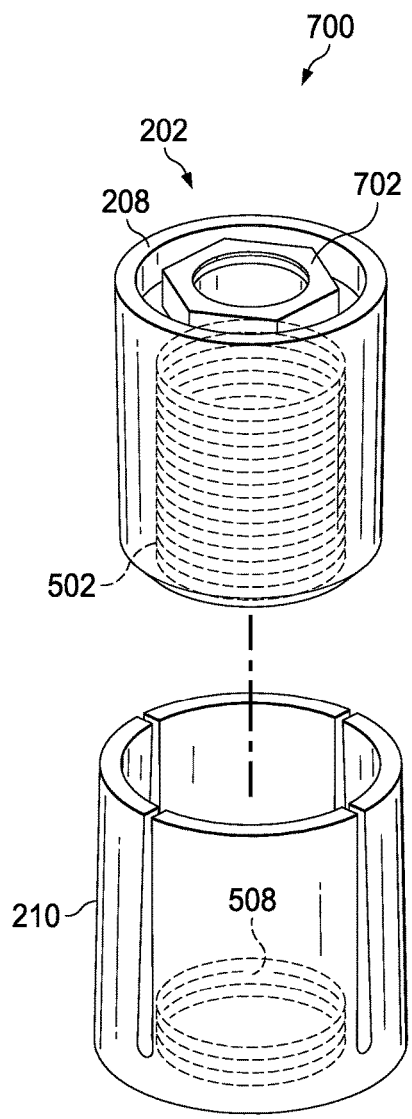
FIG. 7 is an illustration of an exploded isometric view of a first system of a temporary fastener in accordance with an illustrative embodiment.

Turning now to FIG. 7, an illustration of an exploded isometric view of a first system of a temporary fastener is depicted in accordance with an illustrative embodiment. View 700 may be an exploded isometric view of first system 202 of temporary fastener 200 shown in FIG. 2. First system 202 may include first rotatable member 208 and expandable housing 210.

Head 702 of first rotatable member 208 may be used to rotate first rotatable member 208. For example, a socket wrench or other desirable tool may interact with head 702 to rotate first rotatable member 208.

After first rotatable member 208 rotates relative to expandable housing 210, threads 502 may retain first rotatable member 208 relative to expandable housing 210. For example, threads 502 may interact with threads 506 (not depicted) of base 206 (not depicted) to retain first rotatable member 208 relative to expandable housing 210.

Figure 8:
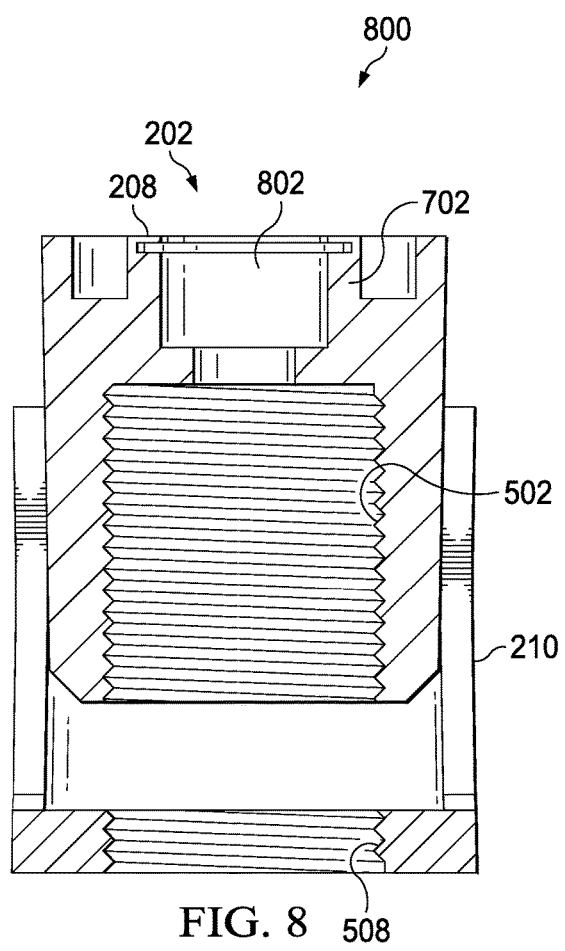
FIG. 8 is an illustration of a cross-sectional view of a first system of a temporary fastener in accordance with an illustrative embodiment.

Turning now to FIG. 8, an illustration of a cross-sectional view of a first system of a temporary fastener is depicted in accordance with an illustrative embodiment. View 800 may be a cross-sectional view of first system 202 of temporary fastener 200. View 800 may be a view of FIG. 6 without second rotatable member 212, expandable shaft 214, or base 206.

As depicted, first rotatable member 208 may have channel 802. Channel 802 may extend through head 702 of first rotatable member 208. When assembled, second rotatable member 212 (not depicted) may extend through channel 802 of first rotatable member 208.

Figure 9:
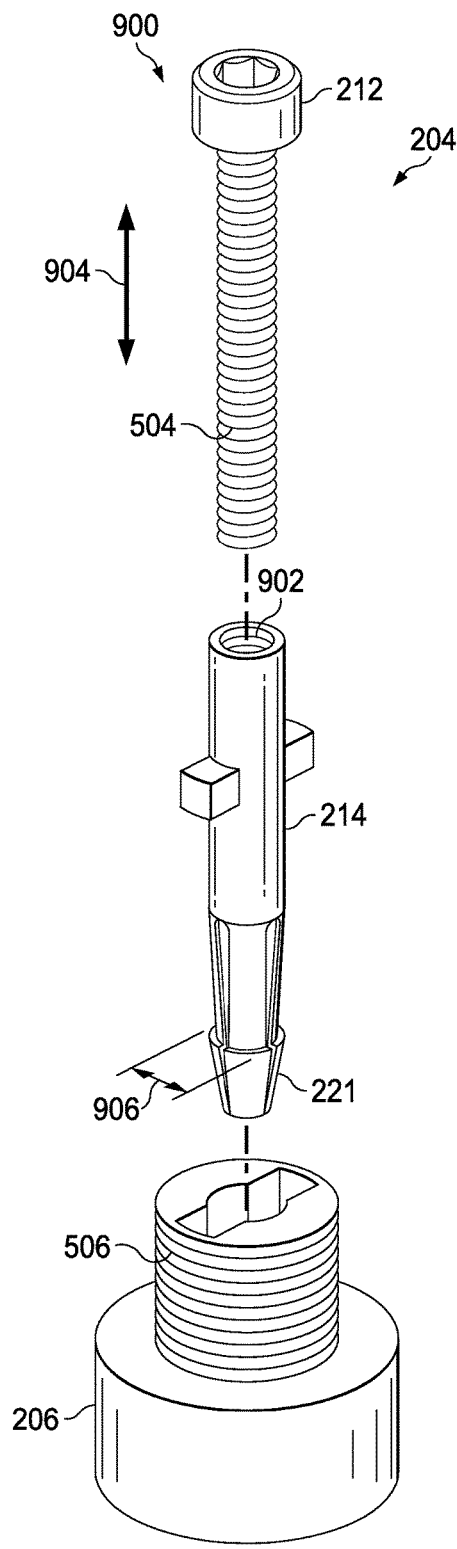
FIG. 9 is an illustration of an exploded isometric view of a second system of a temporary fastener in accordance with an illustrative embodiment.

Turning now to FIG. 9, an illustration of an exploded isometric view of a second system of a temporary fastener is depicted in accordance with an illustrative embodiment. View 900 may be an exploded isometric view of second system 204 of temporary fastener 200. Second system 204 may include second rotatable member 212 and expandable shaft 214.

As depicted, threads 504 of second rotatable member 212 may interact with threads 902 of expandable shaft 214. As threads 504 of second rotatable member 212 interact with threads 902 of expandable shaft 214, second rotatable member 212 may move in direction 904 into or out of expandable shaft 214. As second rotatable member 212 moves into expandable shaft 214, circumference 906 of expandable shaft 214 may increase. As second rotatable member 212 moves out of expandable shaft 214, circumference 906 of shaft 214 may decrease.

Figure 10:
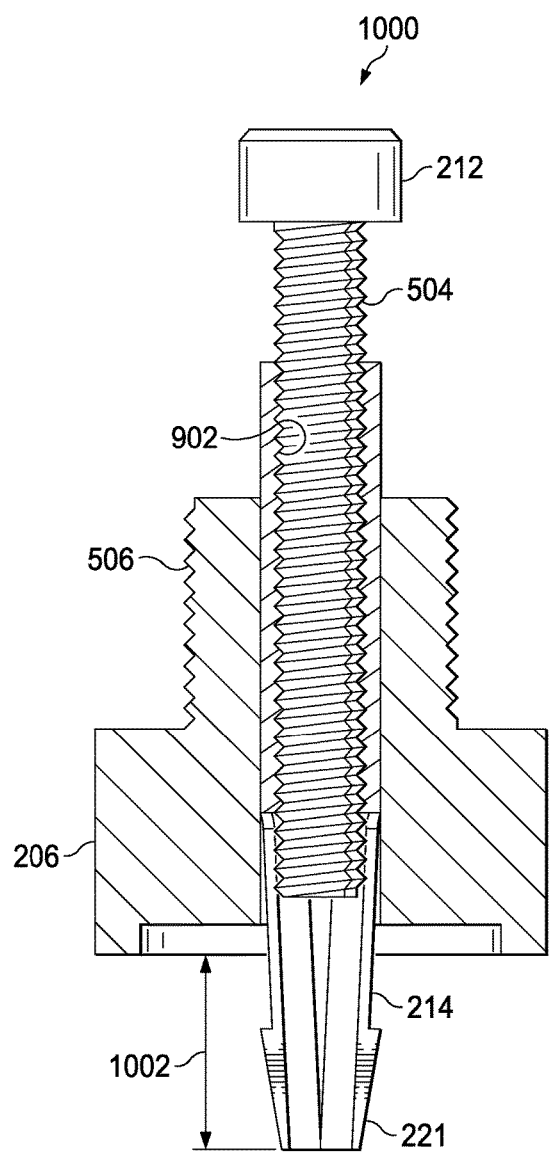
FIG. 10 is an illustration of a cross-sectional view of a second system of a temporary fastener in accordance with an illustrative embodiment.

Turning now to FIG. 10, an illustration of a cross-sectional view of a second system of a temporary fastener is depicted in accordance with an illustrative embodiment. View 1000 may be a cross-sectional view of second system 204 of temporary fastener 200. View 1000 may be a view of FIG. 6 without first rotatable member 208 or expandable housing 210.

As second rotatable member 212 moves into expandable shaft 214, distance 1002 between head 221 of expandable shaft 214 and base 206 may decrease. In some illustrative examples, as second rotatable member 212 moves out of expandable shaft 214, distance 1002 between head 221 of expandable shaft 214 and base 206 may increase.

Figure 11:
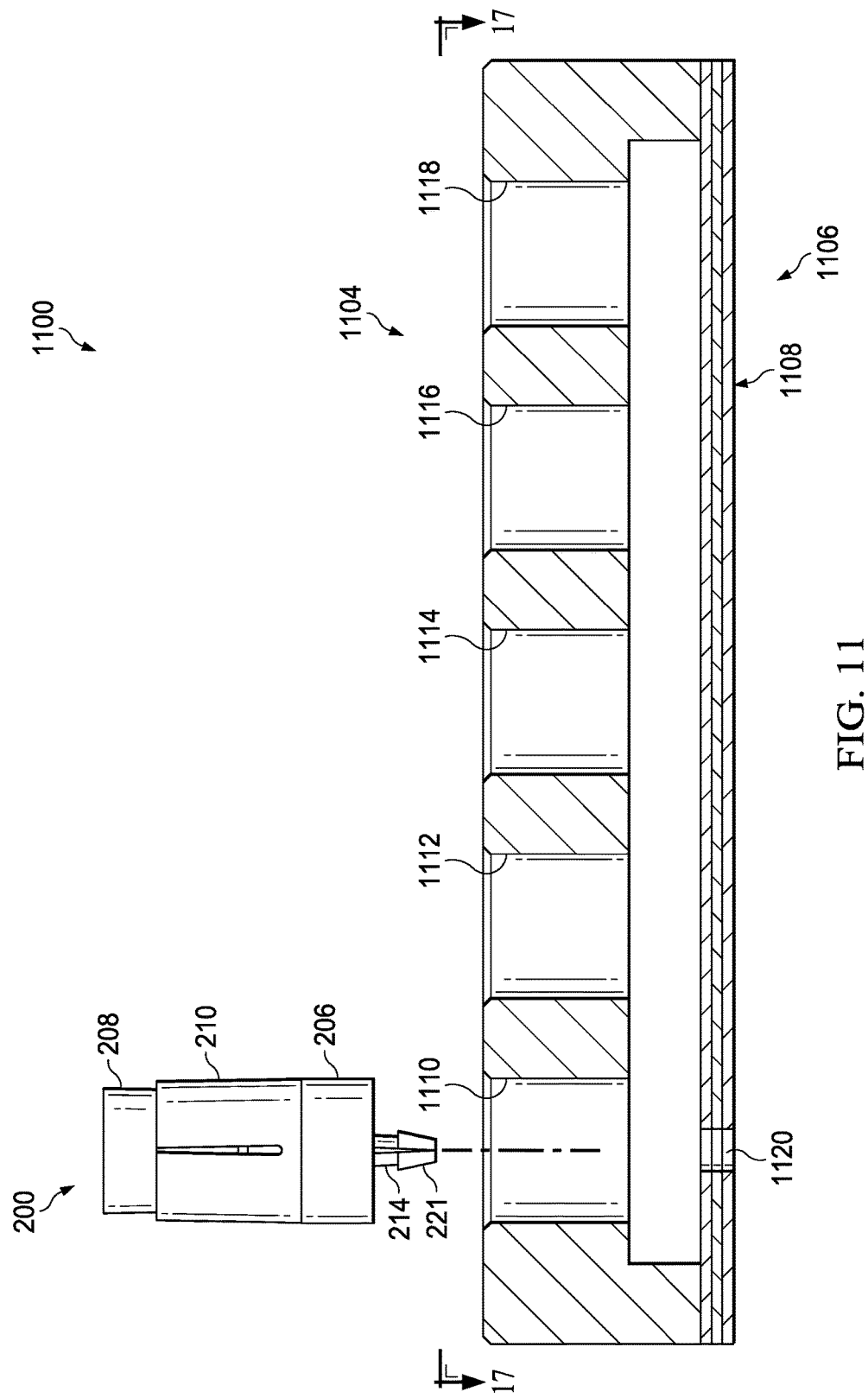
FIG. 11 is an illustration of a cross-sectional view of a manufacturing environment in accordance with an illustrative embodiment.

Turning now to FIG. 11, an illustration of a cross-sectional view of a manufacturing environment is depicted in accordance with an illustrative embodiment. Manufacturing environment 1100 may be a physical implementation of manufacturing environment 100 of FIG. 1. Manufacturing environment 1100 may include temporary fastener 200, drill jig 1104, and workpiece 1106. Workpiece 1106 may be a physical implementation of workpiece 102 of FIG. 1. Workpiece 1106 may include plurality of layers of material 1108. Drill jig 1104 may be a physical implementation of drill jig 104 of FIG. 1. Drill jig 1104 may include hole 1110, hole 1112, hole 1114, hole 1116, and hole 1118.

Temporary fastener 200 may be inserted into hole 1110 of drill jig 1104 to clamp drill jig 1104 to plurality of layers of material 1108. When temporary fastener 200 is inserted into hole 1110, expandable shaft 214 of temporary fastener 200 may extend into hole 1120 in plurality of layers of material 1108.

Figure 12:
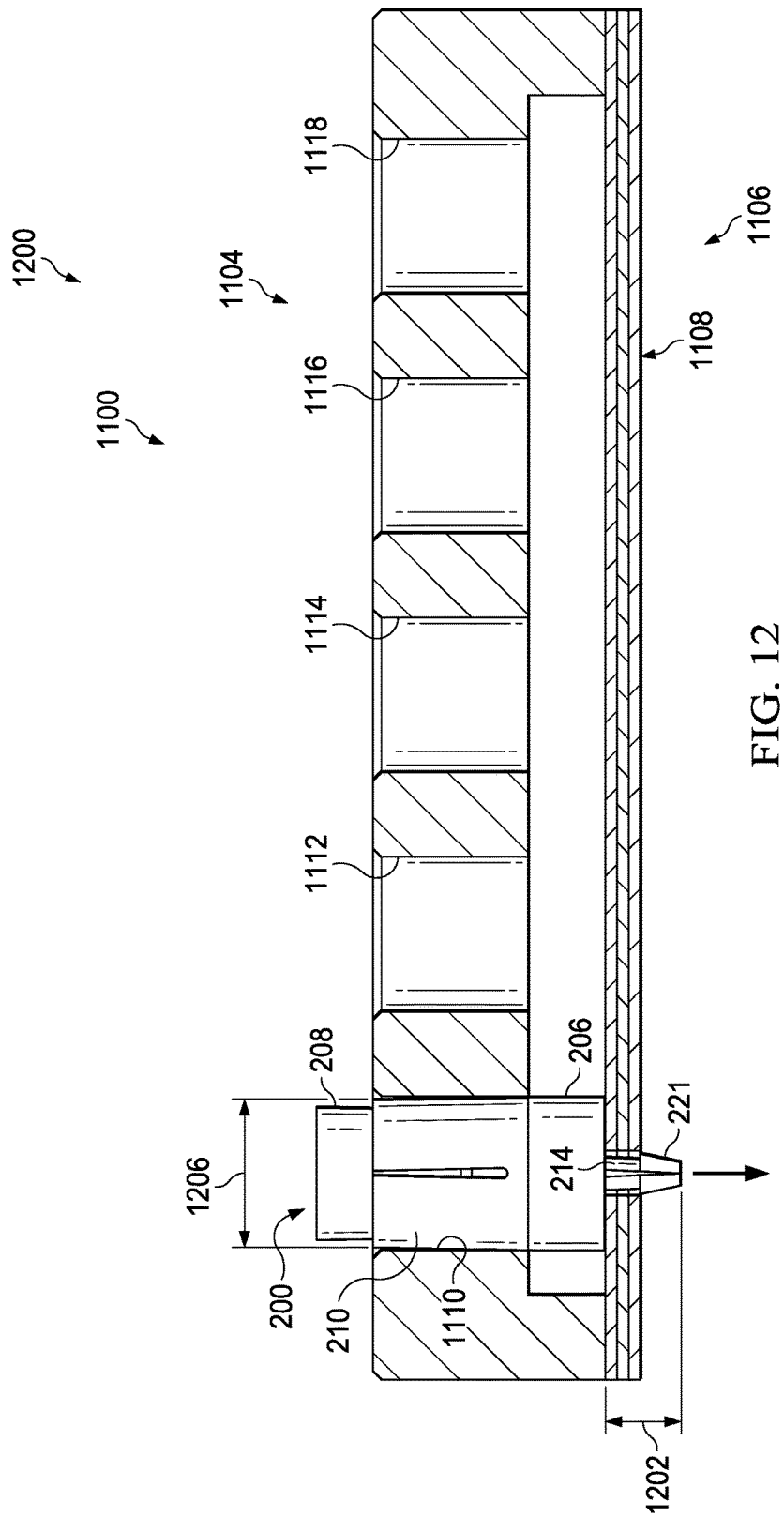
FIG. 12 is an illustration of a cross-sectional view of a manufacturing environment in accordance with an illustrative embodiment.

Turning now to FIG. 12, an illustration of a cross-sectional view of a manufacturing environment is depicted in accordance with an illustrative embodiment. In view 1200 of manufacturing environment 1100, temporary fastener 200 may be inserted in hole 1110. In view 1200, expandable housing 210 may not be in an expanded state (not depicted). Distance 1202 between head 221 of expandable shaft 214 and base 206 is depicted in view 1200. Expandable housing 210 has circumference 1206.

Figure 13:
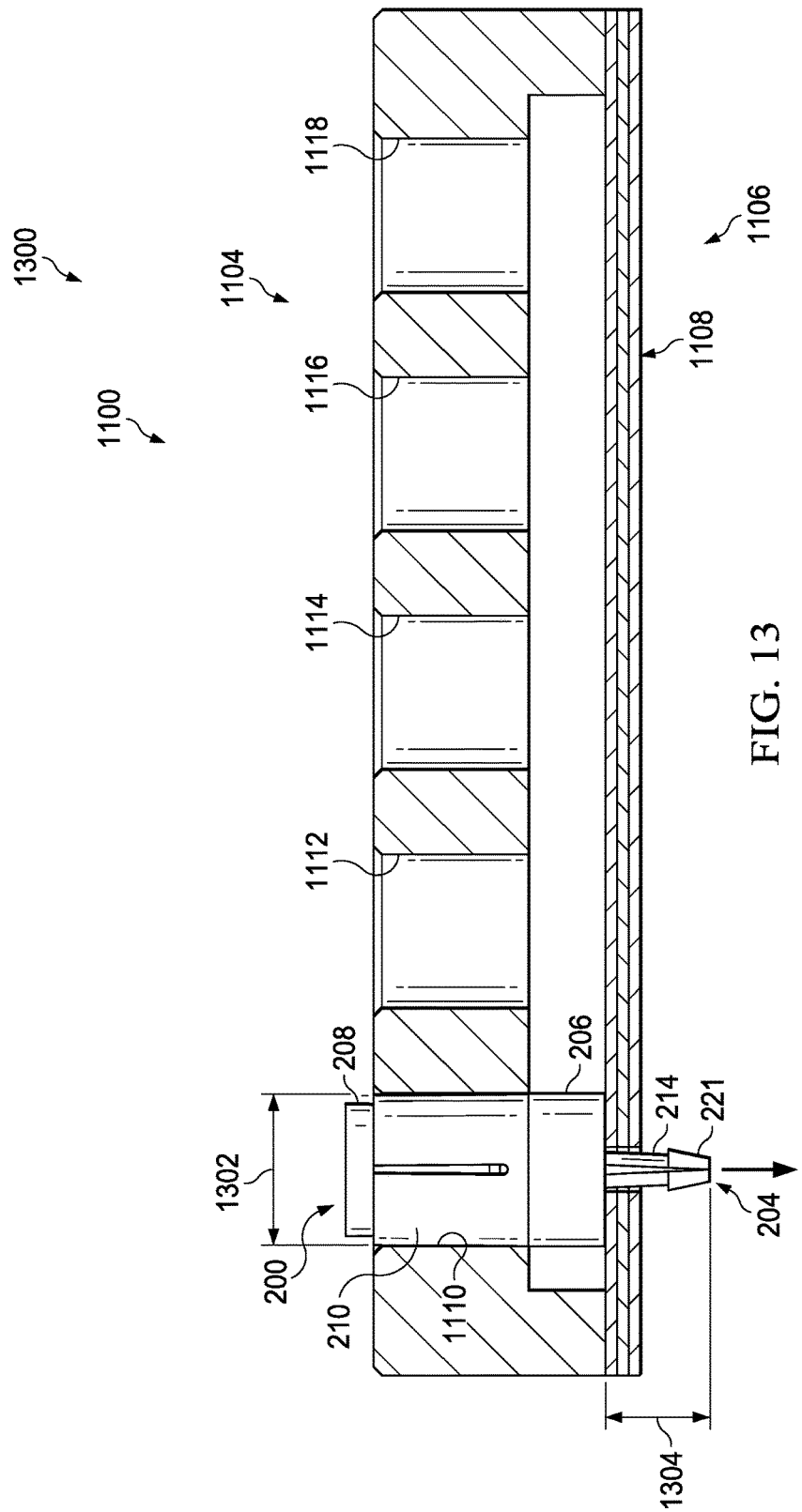
FIG. 13 is an illustration of a cross-sectional view of a manufacturing environment in accordance with an illustrative embodiment.

Turning now to FIG. 13, an illustration of a cross-sectional view of a manufacturing environment is depicted in accordance with an illustrative embodiment. In view 1300 of manufacturing environment 1100, temporary fastener 200 may be inserted in hole 1110. In view 1300, expandable housing 210 may be in an expanded state (not depicted). View 1300 may be a depiction during rotation of first rotatable member 208. As can be seen in view 1300, first rotatable member 208 may move farther into expandable housing 210 than as shown in FIG. 12. By moving into expandable housing 210, first rotatable member 208 may widen expandable housing 210 to have circumference 1302.

By rotating first rotatable member 208, second system 204 may also be affected. As depicted, distance 1304 between head 221 of expandable shaft 214 and base 206 may be greater than distance 1202 in FIG. 12.

Figure 14:
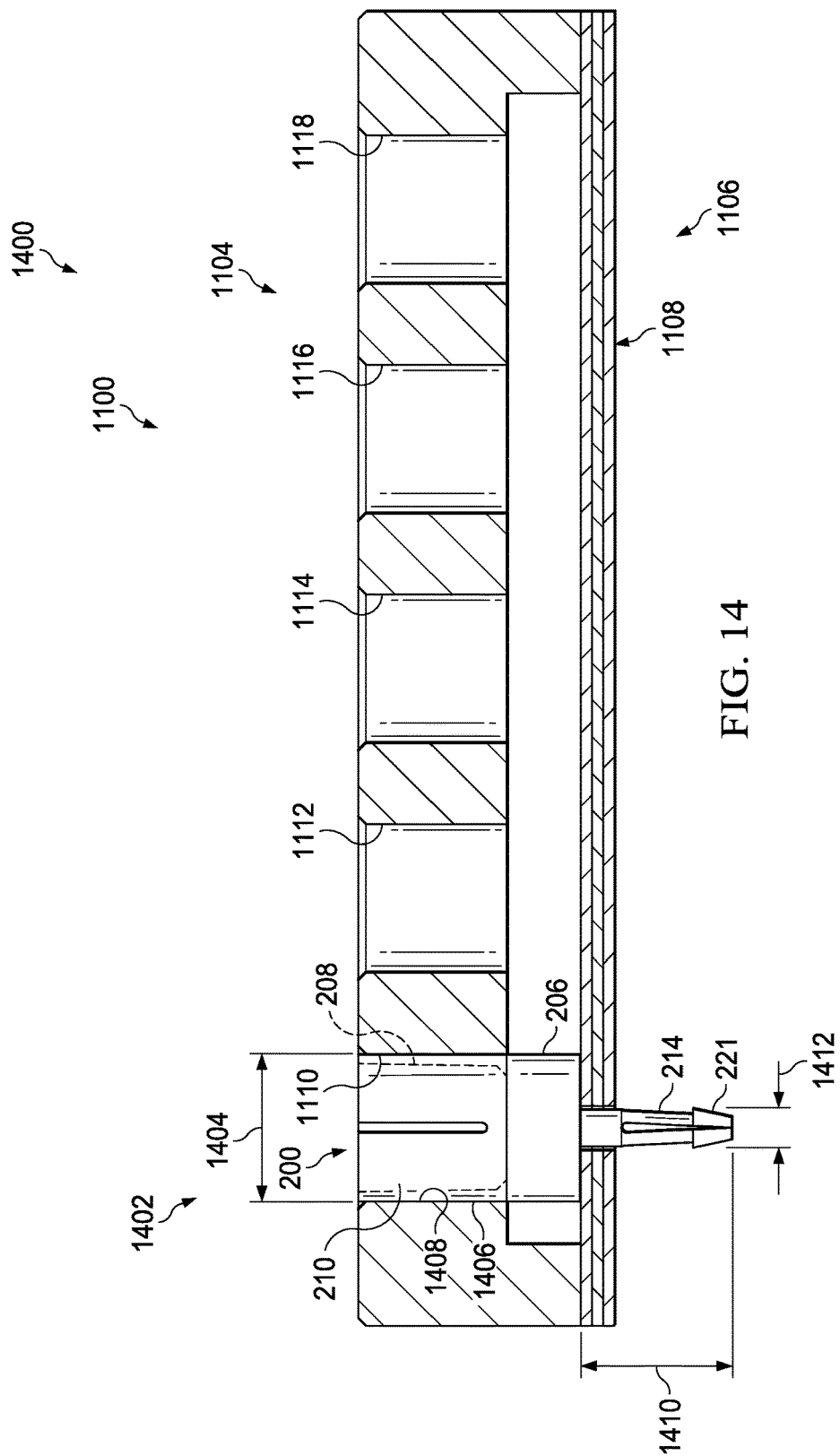
FIG. 14 is an illustration of a cross-sectional view of a manufacturing environment in accordance with an illustrative embodiment.

Turning now to FIG. 14, an illustration of a cross-sectional view of a manufacturing environment is depicted in accordance with an illustrative embodiment. In view 1400 of manufacturing environment 1100, temporary fastener 200 may be inserted in hole 1110. In view 1400, expandable housing 210 may be in expanded state 1402. In expanded state 1402, expandable housing 210 may have circumference 1404. Surface 1406 of expandable housing 210 may contact walls 1408 of hole 1110. By contacting walls 1408 of hole 1110, expandable housing 210 may retain temporary fastener 200 within hole 1110.

Placing expandable housing 210 into expanded state 1402 may also affect second system 204. In view 1400, head 221 of expandable shaft 214 may be distance 1410 from base 206. Distance 1410 may be greater than distance 1304 of FIG. 13 and distance 1202 in FIG. 12. Head 221 of expandable shaft 214 may have circumference 1412.

Figure 15:
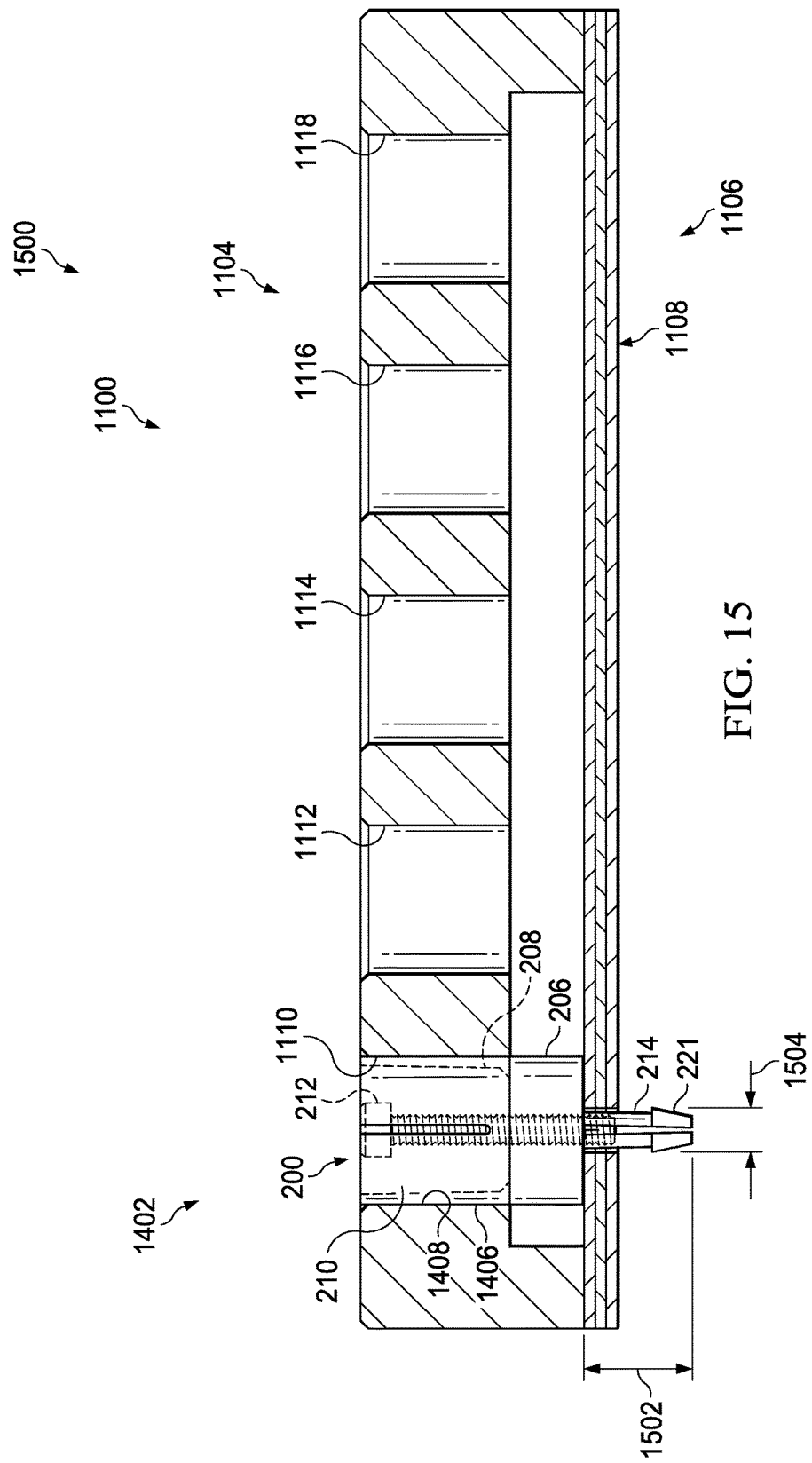
FIG. 15 is an illustration of a cross-sectional view of a manufacturing environment in accordance with an illustrative embodiment.

Turning now to FIG. 15, an illustration of a cross-sectional view of a manufacturing environment is depicted in accordance with an illustrative embodiment. In view 1500 of manufacturing environment 1100, temporary fastener 200 may be retained in hole 1110 by expandable housing 210 in expanded state 1402. View 1500 may be a depiction during rotation of second rotatable member 212. In view 1500, head 221 of expandable shaft 214 may be distance 1502 from base 206. Distance 1502 may be shorter than distance 1410 in FIG. 14. In view 1500, circumference 1504 of head 221 of expandable shaft 214 may be greater than circumference 1412 of head 221 in FIG. 14.

Figure 16:
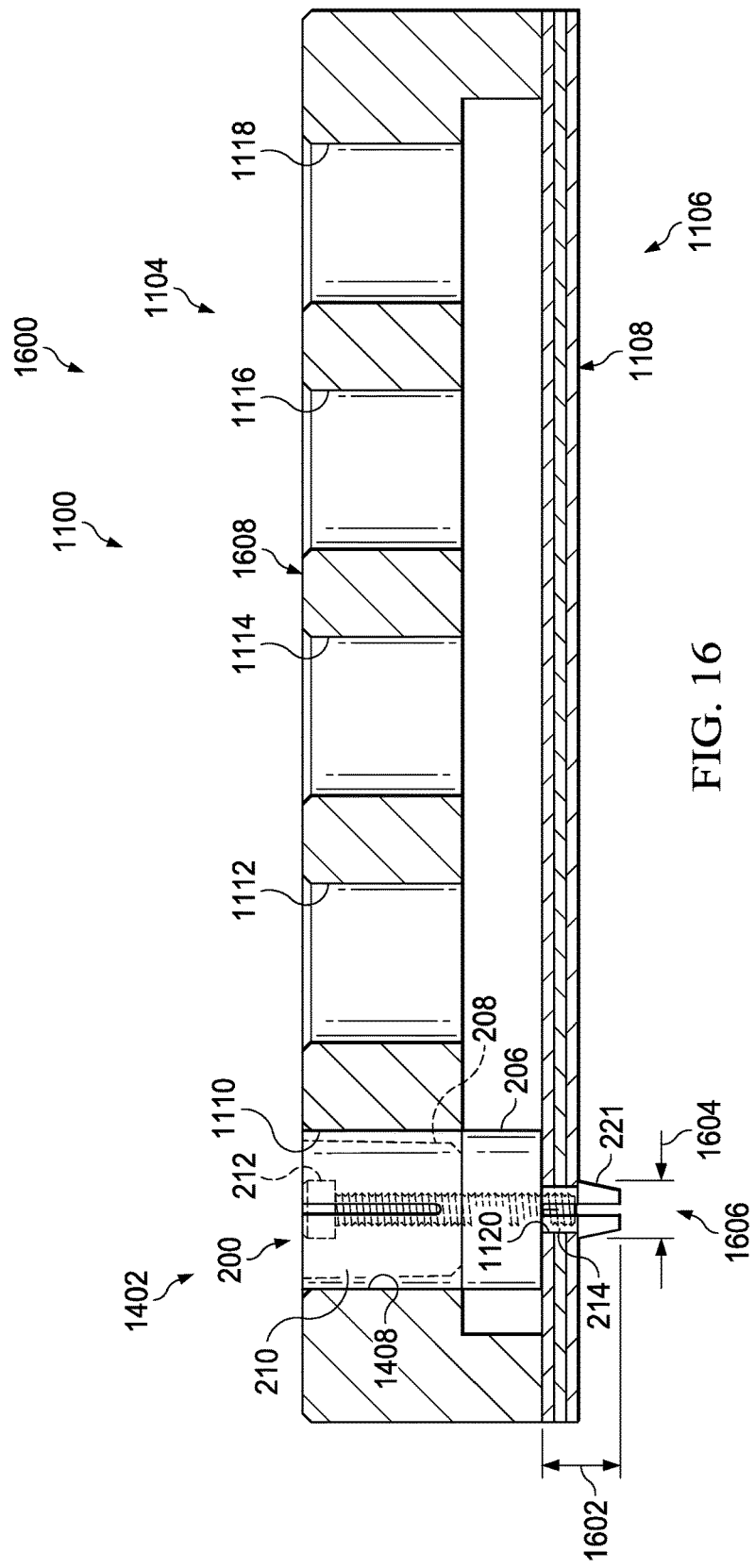
FIG. 16 is an illustration of a cross-sectional view of a manufacturing environment in accordance with an illustrative embodiment.

Turning now to FIG. 16, an illustration of a cross-sectional view of a manufacturing environment is depicted in accordance with an illustrative embodiment. In view 1600 of manufacturing environment 1100, temporary fastener 200 may be retained in hole 1110 by expandable housing 210 in expanded state 1402. View 1600 may be a depiction following rotation of second rotatable member 212. In view 1600, head 221 of expandable shaft 214 may be distance 1602 from base 206. Distance 1602 may be shorter than distance 1410 in FIG. 14 and distance 1502 in FIG. 15. In view 1600, circumference 1604 of head 221 may be greater than circumference 1412 of head 221 in FIG. 14. When head 221 has circumference 1604, head 221 may be too large to fit through hole 1120. As depicted, expandable shaft 214 may be in expanded state 1606. When expandable shaft 214 is in expanded state 1606, plurality of layers of material 1108 may be clamped together. For example, plurality of layers of material 1108 may be clamped between head 221 and base 206 of temporary fastener 200.

As depicted, temporary fastener 200 may clamp workpiece 1106 and drill jig 1104, and temporary fastener 200 may not extend past surface 1608 of drill jig 1104. In some illustrative examples, at least one of first rotatable member 208 or expandable housing 210 may be substantially flush with surface 1608 of drill jig 1104. In some illustrative examples, at least one of first rotatable member 208 or expandable housing 210 may be recessed from surface 1608 of drill jig 1104.

Figure 17:
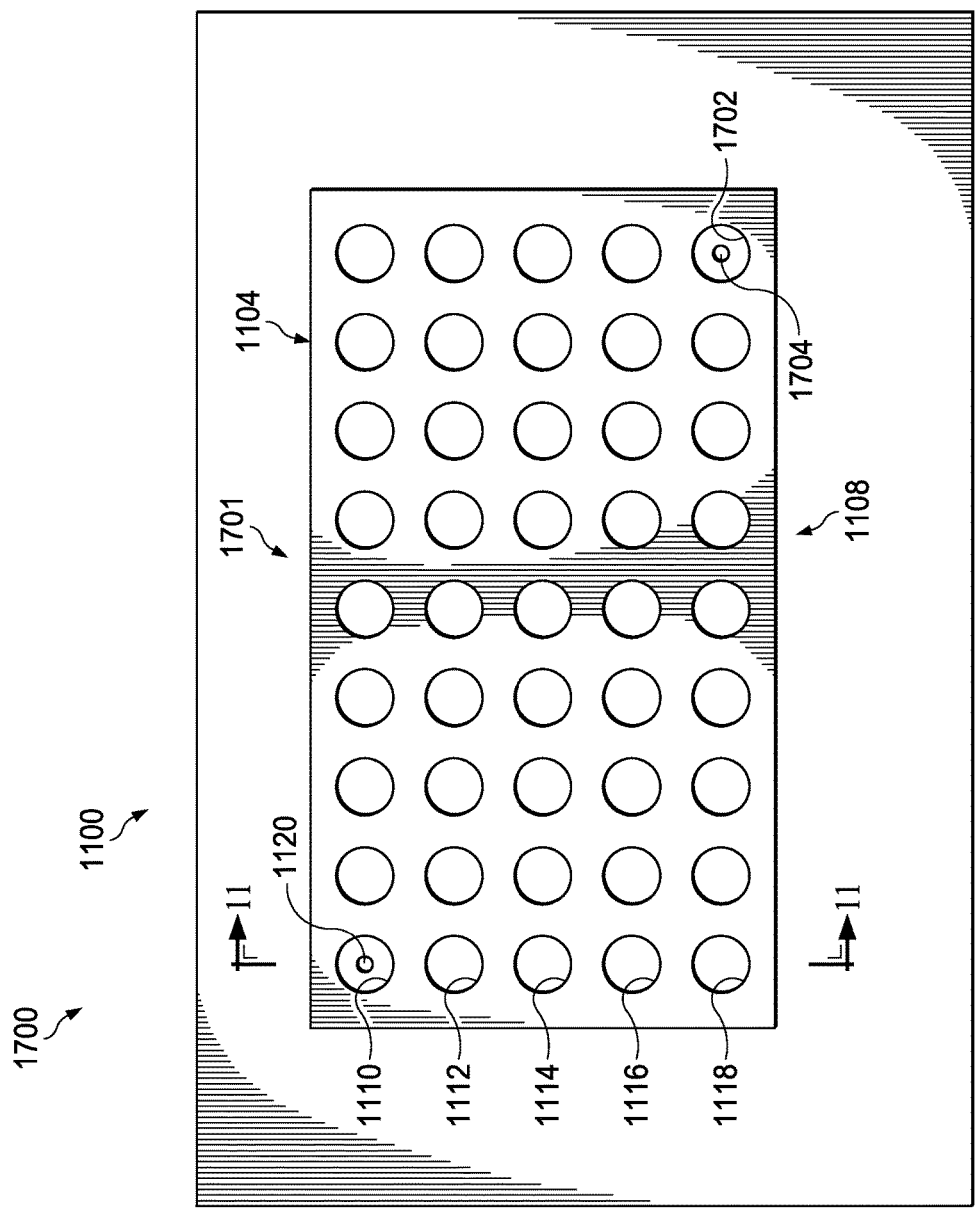
FIG. 17 is an illustration of a top view of a manufacturing environment in accordance with an illustrative embodiment.

Turning now to FIG. 17, an illustration of a top view of a manufacturing environment is depicted in accordance with an illustrative embodiment. View 1700 may be a top view of manufacturing environment 1100 prior to inserting temporary fastener 200 into hole 1110. View 1700 may be a view from direction 17-17 of FIG. 11.

Drill jig 1104 has plurality of holes 1701. Plurality of holes 1701 includes hole 1110, hole 1112, hole 1114, hole 1116, hole 1118, and hole 1702. Hole 1120 and hole 1704 extend through plurality of layers of material 1108. Temporary fasteners (not depicted) such as temporary fastener 200 of FIG. 2 may be positioned in hole 1110 and hole 1702. Second systems (not depicted) of temporary fasteners (not depicted) may extend through hole 1120 and hole 1704 to clamp plurality of layers of material 1108.

When drill jig 1104 is clamped to plurality of layers of material 1108 and plurality of layers of material 1108 are clamped to each other, operations may be performed through drill jig 1104. For example, a hole may be drilled into plurality of layers of material 1108 through hole 1112 of drill jig 1104 during a drilling operation.

In some illustrative examples, additional temporary fasteners (not depicted) may be inserted into additional holes of plurality of holes 1701 after performing drilling operations. For example, after drilling a hole into plurality of layers of material 1108 through hole 1114 of drill jig 1104, a temporary fastener (not depicted) may be inserted into hole 1114. Additional temporary fasteners (not depicted) may provide additional clamping force to plurality of layers of material 1108 and drill jig 1104.

The different components shown in FIGS. 2-17 may be combined with components in FIG. 1, used with components in FIG. 1, or a combination of the two. Additionally, some of the components in FIGS. 2-17 may be illustrative examples of how components shown in block form in FIG. 1 can be implemented as physical structures.

Figure 18:
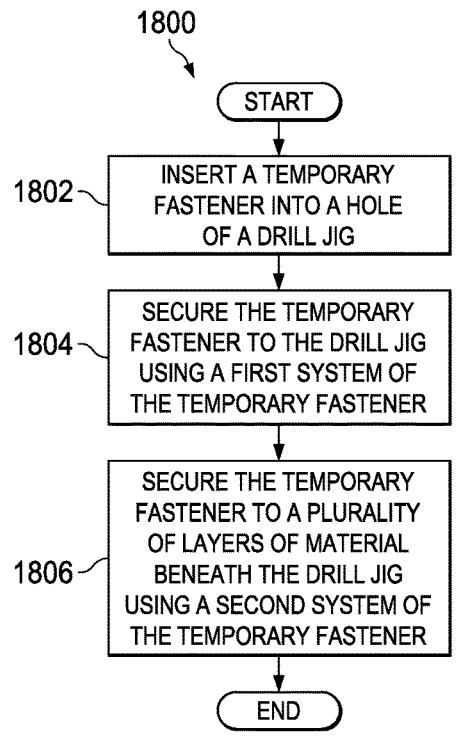
FIG. 18 is an illustration of a flowchart of a process for substantially simultaneously clamping a drill jig and a plurality of layers in accordance with an illustrative embodiment.

Turning now to FIG. 18, an illustration of a flowchart of a process for substantially simultaneously clamping a drill jig and a plurality of layers is depicted in accordance with an illustrative embodiment. Process 1800 may be used to clamp plurality of layers of material 110 of FIG. 1 and drill jig 104 of FIG. 1 substantially simultaneously.

Process 1800 may insert a temporary fastener into a hole of a drill jig (operation 1802). Process 1800 may also secure the temporary fastener to the drill jig using a first system of the temporary fastener (operation 1804). In some illustrative examples, securing temporary fastener 106 may include rotating first rotatable member 118 of first system 112 to push expandable housing 120 of first system 112 into expanded state 130. Rotating first rotatable member 118 may lower first rotatable member 118 towards plurality of layers of material 110. First rotatable member 118 of first system 112 and base 124 may be rotatably connected using threads 125 and threads 126.

Process 1800 may also secure the temporary fastener to a plurality of layers of material beneath the drill jig using a second system of the temporary fastener (operation 1806). Securing temporary fastener 106 to plurality of layers of material 110 beneath drill jig 104 may include rotating second rotatable member 140 of second system 114 to push expandable shaft 142 of second system 114 into expanded state 152. Rotating second rotatable member 140 of second system 114 may pull head 160 of expandable shaft 142 of second system 114 towards drill jig 104. Second rotatable member 140 of second system 114 and expandable shaft 142 of second system 114 may be rotatably connected using threads 148, 150.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

For example, process 1800 may also drill a second hole 188 in plurality of layers of material 110 through a third hole 164 of drill jig 104. Process 1800 may also insert a second temporary fastener 190 into the third hole 164 after drilling the second hole 188 in plurality of layers of material 110. Process 1800 may secure the second temporary fastener 190 to drill jig 104 using a third system of the second temporary fastener 190. Process 1800 may secure the second temporary fastener 190 to plurality of layers of material 110 beneath drill jig 104 using a fourth system of the second temporary fastener 190.

In some illustrative examples, process 1800 may rotate first rotatable member 118 of first system 112 to narrow expandable housing 120 of first system 112. Process 1800 may also rotate second rotatable member 140 of second system 114 to narrow expandable shaft 142 of second system 114. Process 1800 may also remove temporary fastener 106 from hole 162 in drill jig 104 after narrowing expandable housing 120 and expandable shaft 142.

Figure 19:
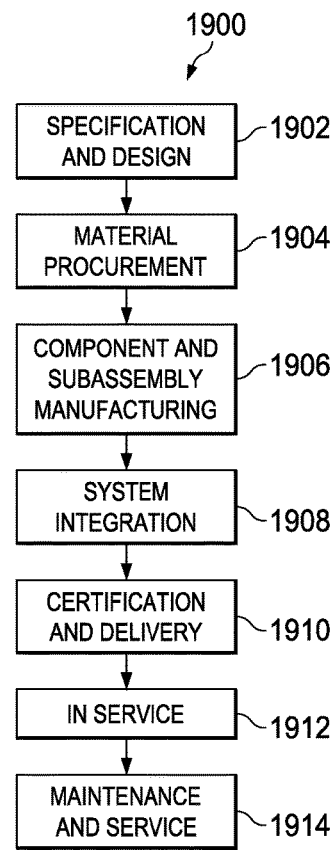
FIG. 19 is an illustration of a block diagram of an aircraft manufacturing and service method in accordance with an illustrative embodiment.
Figure 20:
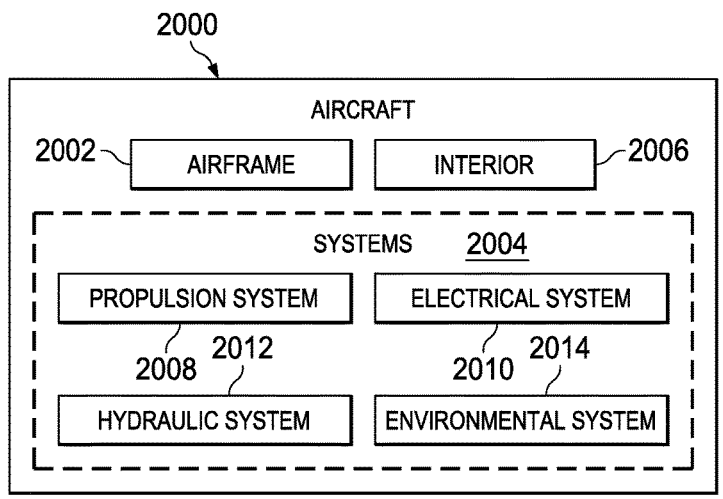
FIG. 20 is an illustration of a block diagram of an aircraft in which an illustrative embodiment may be implemented.

The illustrative embodiments of the disclosure may be described in the context of aircraft manufacturing and service method 1900 as shown in FIG. 19 and aircraft 2000 as shown in FIG. 20. Turning first to FIG. 19, an illustration of a block diagram of an aircraft manufacturing and service method is depicted in accordance with an illustrative embodiment. During pre-production, aircraft manufacturing and service method 1900 may include specification and design 1902 of aircraft 2000 in FIG. 20 and material procurement 1904.

During production, component and subassembly manufacturing 1906 and system integration 1908 of aircraft 2000 in FIG. 20 takes place. Thereafter, aircraft 2000 in FIG. 20 may go through certification and delivery 1910 in order to be placed in service 1912. While in service 1912 by a customer, aircraft 2000 in FIG. 20 is scheduled for routine maintenance and service 1914, which may include modification, reconfiguration, refurbishment, and other maintenance or service.

Each of the processes of aircraft manufacturing and service method 1900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 20, an illustration of a block diagram of an aircraft is depicted in in which an illustrative embodiment may be implemented. In this example, aircraft 2000 is produced by aircraft manufacturing and service method 1900 in FIG. 19 and may include airframe 2002 with plurality of systems 2004 and interior 2006. Examples of systems 2004 include one or more of propulsion system 2008, electrical system 2010, hydraulic system 2012, and environmental system 2014. Any number of other systems may be included. Although an aerospace example is shown, different illustrative embodiments may be applied to other industries, such as the automotive industry.

The apparatuses and methods embodied herein may be employed during at least one of the stages of aircraft manufacturing and service method 1900 in FIG. 19. One or more illustrative embodiments may be used during component and subassembly manufacturing 1906. For example, temporary fastener 106 in FIG. 1 may be used to clamp plurality of layers of material 110 and drill jig 104 during drilling operation 186 during component and subassembly manufacturing 1906. Further, temporary fastener 106 in FIG. 1 may be used to clamp plurality of layers of material 110 and drill jig 104 during drilling operation 186 to perform replacements during maintenance and service 1914.

The method and apparatuses disclosed herein may reduce at least one of manufacturing time or manufacturing cost for drilling operations. Temporary fastener 106 of FIG. 1 may clamp plurality of layers of material 110 and drill jig 104 substantially simultaneously. Temporary fastener 106 may perform these two clamping functions that are traditionally performed by separate fasteners. By temporary fastener 106 performing two clamping functions substantially simultaneously, fewer temporary fasteners may be kept on hand. Further, by performing two clamping functions substantially simultaneously, temporary fastener 106 may create a greater number of clamping locations between drill jig 104 and workpiece 102. Yet further, by performing two clamping functions substantially simultaneously, temporary fastener 106 may create a greater number of clamping locations between plurality of layers of material 110. Increasing the number of clamping locations may increase the quality of workpiece 102 following drilling operation 186. For example, holes generated during drilling operation 186 may be more accurately located. Further, holes created during drilling operation 186 may have fewer burrs or other inconsistencies.

Temporary fastener 106 may not extend past drill jig 104 while clamping drill jig 104 to workpiece 102. Temporary fastener 106 may be substantially flush with surface 183 of drill jig 104. As a result, temporary fastener 106 may not interfere with locating drill 108 in a desirable location relative to workpiece 102. Yet further, because temporary fastener 106 may not extend past drill jig 104 while clamping drill jig 104 to workpiece 102, manufacturing time may be reduced. Manufacturing time spent reinserting and adjusting conventional fasteners to not interfere with drill 108 may not be spent. Thus, temporary fastener 106 may reduce manufacturing time.

Further, it may be desirable to increase the number of clamping locations between drill jig 104 and workpiece 102 after drilling operation 186 is performed. It may also be desirable to increase the number of clamping locations between plurality of layers of material 110 after drilling operation 186 is performed. By temporary fastener 106 performing two clamping operations, temporary fastener 106 may increase at least one of the number of clamping locations between drill jig 104 and workpiece 102 or the number of clamping locations between plurality of layers of material 110.

Yet further, temporary fastener 106 may take at least one of less time or less effort to install than conventional fasteners. As a result, temporary fastener 106 may reduce at least one of manufacturing time or manufacturing cost.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A temporary fastener comprising:
a first system configured to secure the temporary fastener by inserting into a hole of a drill jig by pushing an expandable housing of the first system into an expanded state; and
a second system configured to secure the temporary fastener to a plurality of layers of material beneath the drill jig.

2. The temporary fastener of claim 1, wherein the temporary fastener is substantially flush with or recessed from a surface of the drill jig when the temporary fastener is secured to the drill jig and the plurality of layers of material.

3. The temporary fastener of claim 1, wherein the first system comprises:
a first rotatable member.

4. The temporary fastener of claim 3, wherein the second system comprises:
an expandable shaft; and
a second rotatable member.

5. The temporary fastener of claim 4, wherein the first rotatable member is concentric with the second rotatable member.

6. The temporary fastener of claim 4, wherein the first rotatable member is substantially flush with or recessed from a surface of the expandable housing when the temporary fastener is secured to the drill jig.

7. The temporary fastener of claim 4, wherein the expandable housing applies pressure to a hole of the drill jig when the temporary fastener is secured to the drill jig, and wherein the expandable shaft extends through and contacts the plurality of layers of material when the temporary fastener is secured to the plurality of layers of material.

8. A method comprising:
inserting a temporary fastener into a hole of a drill jig;
securing the temporary fastener to the drill jig using a first system of the temporary fastener; and securing the temporary fastener to a plurality of layers of material beneath the drill jig using a second system of the temporary fastener;
wherein securing the temporary fastener to the drill jig using the first system of the temporary fastener comprises:
pushing an expandable housing of the first system into an expanded state.

9. The method of claim 8, wherein pushing the expandable housing of the first system into the expanded state includes rotating a first rotatable member of the first system to push the expandable housing into the expanded state.

10. The method of claim 9, wherein rotating the first rotatable member lowers the first rotatable member towards the plurality of layers of material.

11. The method of claim 9, wherein the first rotatable member of the first system and the expandable housing of the first system are rotatably connected to a base of the temporary fastener using threads.

12. The method of claim 8, wherein securing the temporary fastener to the plurality of layers of material beneath the drill jig using the second system of the temporary fastener comprises:
pushing an expandable shaft of the second system into an expanded state.

13. The method of claim 12, wherein pushing the expandable shaft of the second system into the expanded state includes rotating a second rotatable member of the second system to push the expandable shaft into the expanded state.

14. The method of claim 13, wherein rotating the second rotatable member of the second system pulls a head of the expandable shaft of the second system towards the drill jig.

15. The method of claim 13, wherein the second rotatable member of the second system and the expandable shaft of the second system are rotatably connected using threads.

16. The method of claim 8, wherein the hole in the drill jig is a first hole, and further comprising:
drilling a second hole in the plurality of layers of material through a third hole of the drill jig;
inserting a second temporary fastener into the third hole after drilling the second hole in the plurality of layers of material;
securing the second temporary fastener to the drill jig using a third system of the second temporary fastener; and
securing the second temporary fastener to the plurality of layers of material beneath the drill jig using a fourth system of the second temporary fastener.

17. The method of claim 8 further comprising:
rotating a first rotatable member of the first system to narrow an expandable housing of the first system;
rotating a second rotatable member of the second system to narrow an expandable shaft of the second system; and
removing the temporary fastener from the hole in the drill jig after narrowing the expandable housing and the expandable shaft.

18. A temporary fastener comprising:
a first system to secure the temporary fastener by inserting into a hole of a drill jig, the first system comprising:
an expandable housing configured to be pushed into an expanded state; and
a first rotatable member; and
a second system to secure the temporary fastener to a plurality of layers of material beneath the drill jig, the second system comprising:
an expandable shaft; and
a second rotatable member rotatably connected to the expandable shaft by threads.

19. The temporary fastener of claim 18, wherein the first rotatable member is concentric with the second rotatable member.

20. The temporary fastener of claim 18, wherein the temporary fastener is substantially flush with or recessed from a surface of the drill jig when the temporary fastener is secured to the drill jig and the plurality of layers of material.

21. The temporary fastener of claim 18, wherein the first rotatable member is substantially flush with or recessed from a surface of the expandable housing when the temporary fastener is secured to the drill jig.

* * * * *